Nov. 26, 1963 M. D. McFARLANE ETAL 3,112,448

PHASE SHIFT KEYING COMMUNICATION SYSTEM

Filed April 28, 1958 4 Sheets-Sheet 1

Nov. 26, 1963 M. D. McFARLANE ETAL 3,112,448

PHASE SHIFT KEYING COMMUNICATION SYSTEM

Filed April 28, 1958

4 Sheets-Sheet 2

3,112,448

PHASE SHIFT KEYING COMMUNICATION SYSTEM

Maynard D. McFarlane, Newport Beach, and Cecil A. Crafts, Pasadena, Calif., assignors to Robertshaw Controls Company, a corporation of Delaware Filed Apr. 28, 1958, Ser. No. 731,334
7 Claims. (Cl. 325—163)

This invention relates to communication systems, and more particularly to a system and method employing phase shift keying for modulating a carrier wave.

In many modern day phase shift communication systems, it is necessary to propagate a separate reference signal which is employed in the receiver for retrieving the information implicit in the modulated signal. In such systems, the atmospheric attenuations and diminutions in the signal strength of the reference signal present a large possibility for error.

The present invention contemplates method and apparatus for use in keyed type communication systems such as teletype and binary data transmission systems. In one aspect of the invention, the information which it is desired to transmit is impressed upon a carrier wave by periodically effecting a phase shift of 180° in the wave. The reference signal is derived from the modulated carrier wave at the receiver, and the requirement for a separate reference signal is entirely eliminated.

By employing this method of operation most of the technical deficiencies of prior art phase shift systems are avoided. For instance, a very substantial reduction in band width is achieved, as compared to conventional systems which modulate either the frequency or amplitude of a carrier signal. This is because the only side bands generated in the propagation of the signal are those produced by the keying frequency.

The acomplishment of such information transfer by means of a single frequency eliminates the disadvantages which invariably attend the use of a pilot carrier in prior art systems. In addition, the derivation of the reference signal directly from the modulated signal detected at the receiver eliminates the lack of stability which often characterized the use of artificial reference signals in many known communication systems.

According to another aspect of the invention, the information in which it is desired to transmit is impressed upon a carrier wave by periodically providing phase displacements of 0°, 120°, and 240° in the carrier wave. By practicing still another aspect of the present invention, the information to be propagated is impressed upon a carrier wave by selectively effecting phase displacements of 0°, 90°, 180°, and 270°. Moreover, in addition to providing method and apparatus for retrieving information from a carrier by distinguishing between the respective phases thereof, the present invention provides method and apparatus for distinguishing between the various phase signals on a time basis.

Accordingly, therefore, a primary object of this invention is to employ a phase modulated carrier wave in a system which has the capacity for deriving a phase reference signal therefrom.

Another object of this invention is to transmit information in a communication system by means of successive phase reversals in a carrier wave.

A further object of this invention is to convey data by means of polarity permutations in a keyed carrier wave.

A still further object of this invention is to convey information over a distance by means of a keyed carrier wave without the necessity for simultaneously propagating a separate reference signal therewith.

These and other objects and advantages of the present invention will become apparent by referring to the following detailed description and drawings in which.

Figures 7, 8:
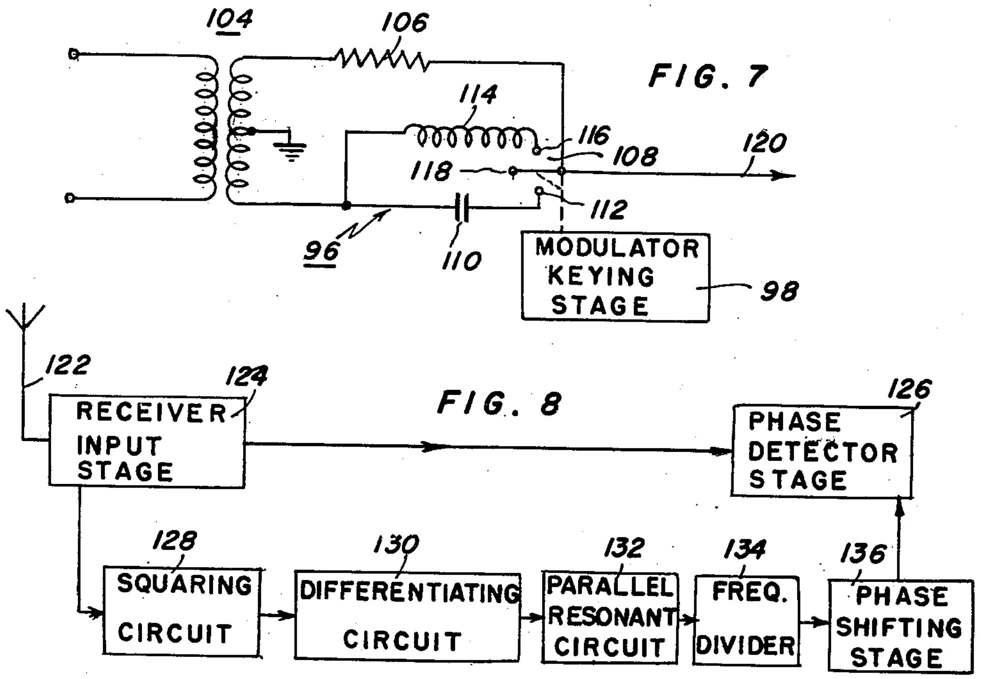
FIG. 7 is a wiring diagram of the circuitry and components of the three phase modulator stage employed in FIG. 6.
FIG. 8 is a block diagram of the receiver circuitry employed in abstracting information from a three phase modulated carrier wave.
Figures 10, 13:
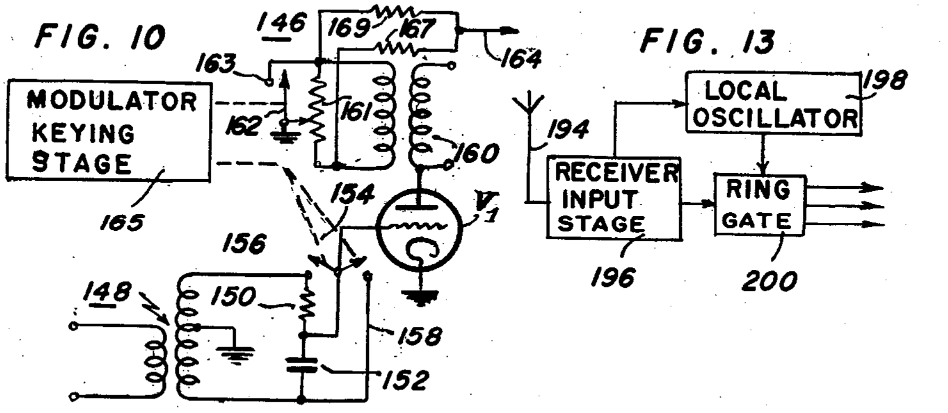
Figures 11, 12:
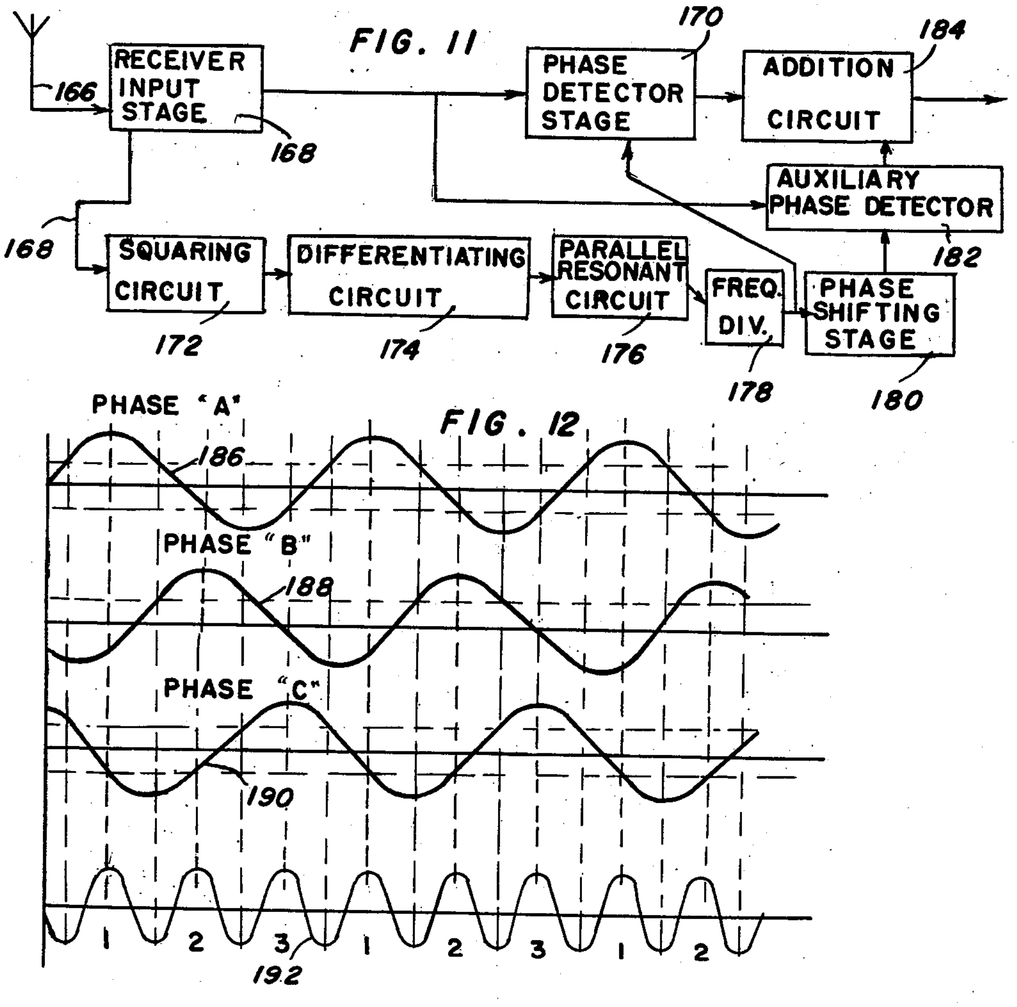

FIG. 9A through FIG. 9D indicate the successive changes experienced by the carrier wave form in traversing portions of the receiver circuitry shown in FIG. 8;

FIG. 10 is a wiring diagram of the circuitry and interconnections provided by the invention for selectively effecting four successive phase displacements in a carrier wave;

FIG. 11 is a block diagram of the receiver circuitry which is utilized in retrieving a message from a four phase modulated carrier wave;

FIG. 12 shows diagrammatically the interrelationships between several wave forms in a three phase modulated system, and is used to explain the separation of signals in the received carrier on a time base; and FIG. 13 is a block diagram of the apparatus employed in acomplishing electronic commutation of the incoming signals.

Figure 1:
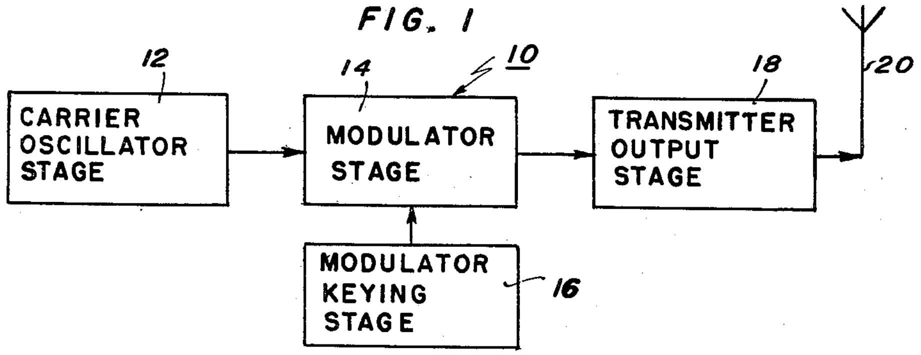
FIG. 1 is a block diagram of the transmitter provided by the present invention.

Referring more particularly to the drawings, in FIG. 1 the numeral 10 indicates generally the components of the transmitter used in the present invention. The transmitter 10 will be seen to include a carrier oscillator stage 12. The oscillator stage 12 is characterized by the ability to produce an alternating current signal of predetermined frequency. The oscillatory signal produced by the stage 12 is applied as an input signal to modulator stage 14. The modulator stage 14 includes circuitry and components for rapidly reversing the phase of the carrier signal by 180°. Although the circuitry for accomplishing this phase reversal forms an integral part of the present invention, it should be appreciated that the reception of signals from a conventional type of phase shift keying transmitter is possible by employing the receiver system according to the present invention.

The periodic reversal of the carrier signal by the modulator stage is effected in response to signals provided by a modulator keying stage 16. The modulator keying stage 16 may include suitable electromechanical means for rapidly shunting one or more of the impedance elements within the modulator stage. It will be appreciated that space discharge devices, gas tubes, transistors or the like would be equally feasible for this purpose.

Figure 3:
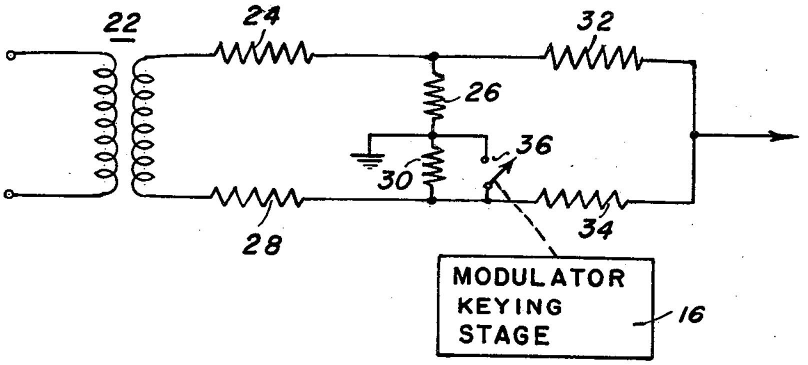
FIG. 3 is a wiring diagram of the circuitry and components of the modulator stage which is used in practicing the invention.

The stage 14, shown in detail in FIG. 3, includes a switch 36 in order to accomplish the phase reversals in the carrier. The term "switch" as used in this connection may comprehend the several common types of electrical closures. One terminal of the switch 36 is connected to the grounded junction between resistors 26 and 30. The opposite terminal of the switch 36 is connected between the resistors 28 and 30. When the switch 36 is in the open position, the output of stage 14 takes the form of a positive electrical wave; conversely, when the switch 36 is closed, the output of the stage is reversed by 180° that takes the form of a negative electrical wave. The modulated carrier wave thus produced appears between the junction point of resistors 32 and 34 and ground.

The switch 36 which shunts resistor 30 in FIG. 3 is periodically opened and closed by means of the modulator keying stage 16 shown in FIG. 1. Although the switch 36 has been referred to in terms most apt for the description of a mechanical device, it should be understood that the switching function which periodically shunts the resistor 30 may be accomplished by space discharge devices, gaseous conduction devices, or the like. For instance, the use of a pulsed thyratron tube, or the like to shunt the resistor 30 would be included.

Figure 2:
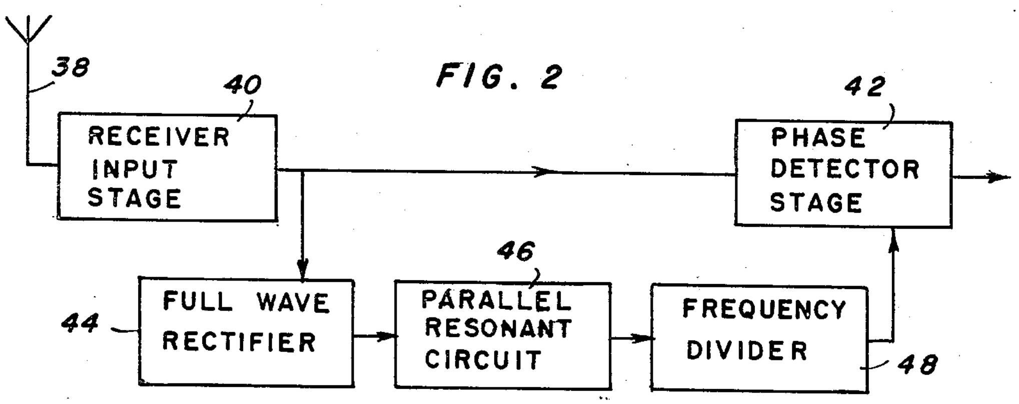
FIG. 2 is a block diagram of the receiver circuitry of the present invention.

Turning to FIG. 2, the receiver circuitry includes a receiver antenna 38 which samples the incoming modulated carrier wave. The receiver input stage may receive energy directly from the transmitter via a conventional coaxial cable or the like. The signal received by the antenna 38 is applied to a receiver input stage 40. The stage 40 may include suitable stages of amplification for compensating for any reductions in signal strength which have occurred during the propagation of the carrier wave. Moreover, stage 40 may include suitable impedance matching circuitry and the like for insuring optimum energy transfer from the antenna, or cable, as the case may be.

The modulated signal which occurs at the output of the stage 40 is applied directly to a phase detector stage 42. In order to retrieve the information implicit in the modulated carrier, means are provided within the receiver circuit for developing a reference signal having a wave form identical with that of the carrier wave before it has been keyed, or modulated.

In order to develop such a reference signal, the modulated signal from the receiver input stage 40 is applied to a full wave rectifier 44. The succession of positive voltage impulses produced by the full wave rectifier 44 is then used to excite a parallel resonant circuit 46. The resonant circuit 46 is tuned to the second harmonic of the frequency produced by the transmitter. The parallel resonant circuit 46 is characterized by a high "Q." This high "Q" resonant circuit carries on the action of deriving a reference signal during momentary interruptions which occur in the reception of carrier as a result of keying transients or atmospheric fading. This, of course, is because of the cyclic interchange of energy which occurs between the inductance and capacitance elements in such a resonant circuit.

After the modulated carrier has been acted upon by the full wave rectifier 44 and the high "Q" parallel resonant circuit 46, there is made available within the receiver a sine wave of twice the frequency of the original oscillatory carrier signal. Even more important, however, is the fact that the output wave form developed by the resonant circuit exhibits no evidence of the keying, or phase modulation which was formerly impressed thereon. By effecting a frequency division, there is provided within the receiver a phase reference signal which is accurate and completely free of the atmospheric distortion which characterizes prior art phase shift systems of the type which employ a separate reference signal.

The frequency reduction which is applied to the output of the resonant circuit is accomplished by means of a frequency divider 48. The divider 48 may comprise a conventional circuit such as a bistable multivibrator, or the like which derives an output signal in the form of a submultiple of the input frequency.

The output potential of the divider 48 comprises an oscillatory signal having the same frequency as the carrier wave and constant phase. This signal is used as a reference signal within the phase detector stage 42. The stage 42 compares the phase of the incoming modulated signal with that of the constant phase reference signal provided by the frequency divider 48, and develops an output potential related to the differences therebetween.

Figure 4:
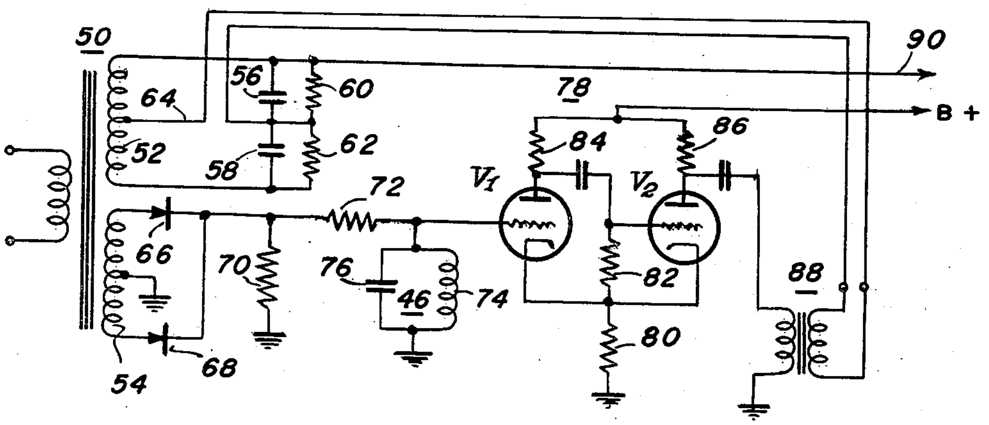
FIG. 4 is a wiring diagram of the circuitry and interconnections provided within the receiver circuit.

The circuitry and interconnections for accomplishing the functions set forth immediately above are illustrated in FIG. 4, including a coupling transformer 50 in the lefthand portion thereof. The primary winding of the transformer 50 may receive an input signal from the receiver input stage 40. The transformer 50 is provided with a pair of secondary windings 52 and 54. One end of the secondary winding 52 is interconnected to the opposite end by means of a pair of series connected capacitors 56 and 58. The capacitor 56 is shunted by a resistor 60, and the capacitor 58 is shunted by a resistor 62. The winding 52 is provided with a tap terminal 64 for purposes to be explained more fully below. This secondary winding taken in conjunction with the component capacitors and resistors comprises a phase detector which is able to compare the phase of the reference signal with that of the modulated signal.

The secondary winding 54 is closed upon itself through a pair of series connected oppositely-poled diode elements 66 and 68. The common connection between the diode elements 66 and 68 is grounded through a resistor 70. The potential developed across resistor 70 is coupled to a parallel resonant circuit 46 through resistor 72. The resonant circuit 46 includes a conventional inductance 74 and capacitance 76. One junction between the inductance and capacitance is grounded, and the opposite junction is connected to excite a conventional multivibrator 78 comprised of a pair of space discharge devices V1 and V2 with associated impedance elements.

The resonant circuit 46 is connected to the control grid of the space discharge device V1. The anode of V1 is interconnected to the control grid electrode of the space discharge device V2 via a coupling capacitor. The cathode elements of the respective discharge devices are connected in common and coupled to ground through a resistor 80. The control grid of the device V2 is connected to the commonly connected cathodes via resistor 82. Operating potential is supplied to the discharge devices V1 and V2 through plate load resistors 84 and 86, respectively. The output wave form developed by the multivibrator 78 is capacitor coupled to the primary of an output transformer 88. It will be appreciated that the function of the multivibrator 78 is to reduce by a factor of 2 the frequency of the oscillatory signal developed by the resonant circuit 46.

It will now be evident that the diodes 66 and 68 acting in conjunction with the resonant circuit 46 and the multivibrator 78 act to provide a reference signal which has a wave form substantially identical with that produced by the oscillator stage 12 within the transmitter. This unmodulated wave form is inductively coupled back to the phase detecting stage 42 by means of transformer 88 for comparison with the modulated carrier wave therein. Thus, one terminal of the secondary winding of transformer 88 is connected to the tap terminal 64 provided on winding 52. The opposite end of the secondary winding of transformer 88 is connected to the junction point between capacitors 56 and 58. The output signal developed by the phase detector 42 is made available on the conductor 90, shown in the uppermost portion of the drawing.

The inter-relationships between the various wave forms which characterize the invention are illustrated in FIGS. 5A, 5B, 5C and 5D. Thus, in FIG. 5A, successive positive cycles of the carrier frequency are seen to occur while the switch 36 occupies an open position. When the switch 36 is closed, as evidenced by the negative rectangle in FIG. 5B, the phase of the carrier shifts by 180° and becomes negative.

Figure 5A:
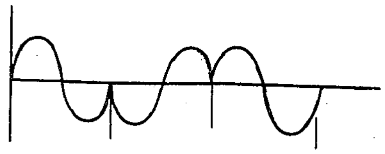
FIG. 5A illustrates the form of the modulated carrier wave.
Figure 5B:
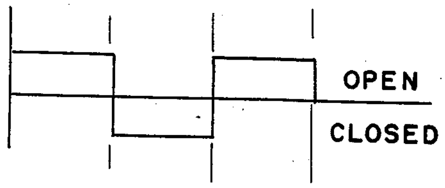
FIG. 5B shows the time relationship between open and closed switching positions within the modulator stage and the carrier wave immediately thereabove.
Figure 5C:
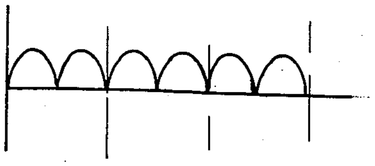
FIG. 5C illustrates the form of the modulated carrier wave after full wave rectification within the receiver.
Figure 5D:
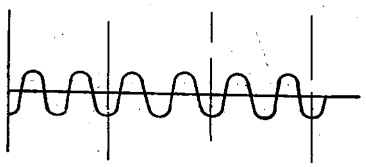
FIG. 5D illustrates the appearance of the double frequency signal which is produced within the receiver by passing the rectified signal shown in FIG. 5C through a resonant circuit.

In FIG. 5C, the successive nodes or voltage loops provided by the rectifier 44 are illustrated. Directly beneath FIG. 5C, the double frequency sinusoidal signal produced by the resonant circuit 46 is shown. It will be recalled from the earlier portions of the detailed description that the double frequency wave form shown in FIG. 5D exhibits no modulation, and forms a reference signal after frequency reduction within the multivibrator stage 78. As earlier explained, the reference signal thus developed is free of the atmospheric distortion and attenuation which accompanies the propagation of a separate reference signal in prior art systems.

Figure 6:
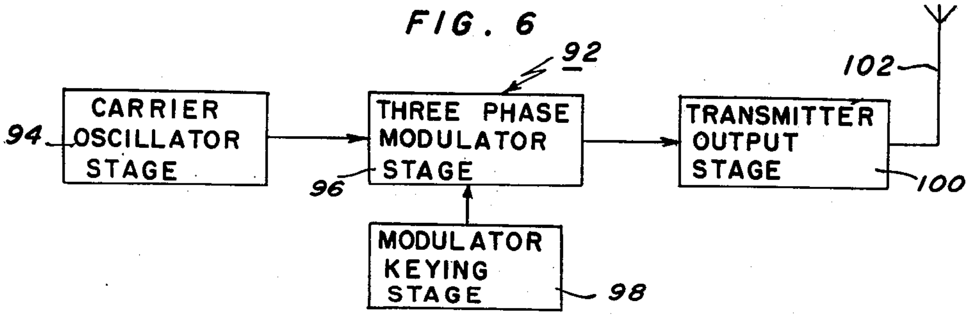
FIG. 6 is a block diagram of the transmitter utilized for propagating a carrier wave characterized by three input conditions or phase positions.

As shown in FIG. 6, the numeral 92 has been used to indicate generally an embodiment of the invention suitable for use in transmitting intelligence with three different input conditions or phase positions in a carrier wave. The three input conditions or phase positions which are provided by the circuitry shown in FIG. 6 take the form of sinusoidal carrier wave signals having phase displacements of 0°, 120°, and 240° with reference to zero time.

The system for producing these phase displaced signals will be seen to include a carrier oscillator stage 94. The oscillator stage 94 is characterized by the ability to produce an alternating current output signal of predetermined amplitude and frequency. The output signal thus produced is applied to a three-phase modulator stage 96 which includes circuitry and components for rapidly shifting the phase of the carrier signal between the respective 0°, 120°, and 240° phase positions. It should be appreciated that the circuitry and components located within stage 96 for the purpose of accomplishing these rapid variations in the phase of the carrier form an integral part of the present invention and will be described in detail hereinafter.

The modulator stage 96 accomplishes the selective variation in the phase carrier signal in accordance with the operation of a modulator keying stage 98. The modulator keying stage 98 may include suitable electronic or electro-mechanical means for rapidly connecting and disconnecting the requisite values of impedance within the modulator stage in order to selectively provide the phase displaced sine wave signals necessary to the transmission of intelligence contemplated by the invention.

The phase modulated carrier wave produced at the output terminals of the stage 96 is applied to a transmitter output stage 100. The stage 100 may include conventional circuitry and components for amplifying or otherwise appropriately modifying the modulated carrier. Where it is intended to propagate the modulated signal through space as an electromagnetic wave, the output signal from stage 100 is coupled to an antenna 102. If desired, the output signals from stage 100 may be applied through a suitable coaxial cable or the like to the intended reception site, rather than by means of space propagation from an antenna. The stage 100 will be understood in this connection to include suitable equipment for providing optimum energy transfer to the antenna or cable, as the case may be, and such equipment may comprise one or more stages of conventional impedance matching circuitry.

One form of the apparatus for selectively varying the phase of the carrier wave is schematically illustrated in FIG. 7 and includes a coupling transformer 104. The primary winding of this transformer is connected to receive the alternating carrier signal developed by the oscillator stage 94.

One end of the secondary winding of coupling transformer 104 is electrically connected through a resistor 106 to the movable arm of a three position switch 108. The switch 108 may include a conventional pivotally mounted electromechanical switch provided with a movable member which is capable of successively engaging any one of the three terminals. The opposite end of the secondary winding of transformer 104 is connected through a capacitor 110 to terminal 112 of the three position switch. This end of the secondary winding is also connected to one end of an inductor 114 which terminates at terminal 116 of the same switch. It will be observed that the movable arm of the switch may contact an intermediate terminal 118 located between the terminals 116 and 112. The signal from transformer 104 which is sampled by the movable element of the switch 108 is coupled to the subsequent stages of circuitry via an output conductor 120.

In order to provide a pair of sinusoidal wave forms which differ by 120° and 240° from the initial zero phase position of the carrier, it is necessary to provide definite values of impedance for the capacitor 110 and the inductor 114. The initial zero phase position is, of course, generated when the movable element of switch 108 engages the intermediate terminal 118. The value of the reactance for the inductor 114 must be such that, taken in conjunction with the other parameters in the circuit, a wave form displaced by 120° from the zero phase position is provided whenever the movable arm of the three position switch engages contact 116.

The capacitive reactance of the condenser 110 is proportioned to equal the inductive reactance of the inductor 114. When the movable arm of the three position switch 108 receives potential from terminal 112, the 120° phase shift thus will be effected in a direction opposite to that provided by the inductor 114. For open circuit conditions when the movable arm of the three position switch engages contact 118, the zero phase shift carrier wave is inductively transferred directly from transformer 104 to the output conductor 120 without the use of any phase shifting impedance elements.

In FIG. 8, the receiver circuitry which is utilized in retrieving intelligence from the three phase modulated carrier is shown. This circuitry includes a receiver antenna 122 which samples the incoming modulated carrier wave and applies it to a receiver input stage 124. The stage 124 may also receive energy directly from the transmitter via a conventional coaxial cable or the like. The stage 124 may include suitable amplification circuitry which compensates for any reductions in signal strength occurring during the propagation of the carrier wave. Appropriate impedance matching circuitry and the like for insuring optimum energy transfer from the antenna, or cable, may also be provided within the stage 124.

The modulated signal which appears at the output of stage 124 is applied directly to a phase detector stage 126. In order to develop the message implicit in the phase modulated carrier, means are provided within the receiver circuit for developing a reference signal which duplicates the wave form of the carrier wave as it appeared prior to being modulated.

In order to develop a reference signal, the modulated signal from the receiver input stage 124 is applied to a squaring circuit 128. The output square wave derived by circuit 128 is applied to a differentiating circuit 130. The circuit 130 develops a time-spaced series of voltage spikes which occur simultaneously with the changes in sign in the output square wave developed by the circuit 128. These voltage spikes are coupled to a parallel resonant circuit 132 which is tuned to the third harmonic of the carrier wave frequency. From the resonant circuit 132, the triple frequency output sine wave is applied to a frequency divider 134. The divider 134 may comprise a conventional count-down circuit which has the capacity to produce an output signal at a frequency which is a sub-multiple of the input frequency.

The output potential of the frequency divider 134 comprises an oscillatory signal having the same frequency as the carrier wave and constant phase. This signal is utilized as a reference signal within the receiver after passage through a phase shifting stage 136. The phase shifting stage 136 includes circuitry and components for shifting the phase of the oscillatory input signal by 30°. By this means the output of the divider is displaced 90° out of phase with the input signal, at one of the input phase conditions. Comparison of the phase shifted reference signal produced by stage 136 with the three phase modulated carrier is accomplished within the phase detector stage 126.

For the input phase with which the reference signal now exhibits a 90° phase displacement, the output of the phase detector 126 will be zero. On the other hand, the other two phase modulated positions of the carrier wave will result in positively and negatively polarized output potentials respectively. By this means, the inventive feature of transferring information with the three input conditions or phase positions is provided.

Figure 9A:
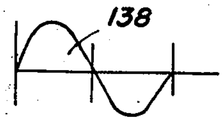
Figure 9B:
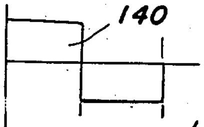

By referring to the wave forms shown in FIG. 9A through FIG. 9D, the successive changes in the signal accomplished by the system shown in FIG. 8 in order to develop a reference signal from the modulated carrier will be more readily appreciated. In FIG. 9A, the sinusoidal signal appearing at the output of the receiver input stage 124 has been designated by the reference numeral 138. Directly beneath FIG. 9A, the appearance of the wave form produced by the squaring circuit 128 has been identified in FIG. 9B by the reference numeral 140.

Figure 9C:
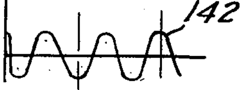

In FIG. 9C, the wave form of a third harmonic sine wave produced by the parallel resonant circuit 132 has been identified by the reference numeral 142. Below this triple frequency sine wave, a group of output voltage spikes 144 developed by the differentiating circuit 130 have been illustrated in FIG. 9D. It will be appreciated in this connection that the differentiation which produces the spikes 144 in FIG. 9D occurs prior to the production of the waveform 142 within the resonant circuit.

Figure 9D:

The correspondence between the zero axis crossings of the third harmonic sine wave in FIG. 9C and the voltage spikes in FIG. 9D is exploited in the redevelopment of the reference signal. Thus, reference to FIGS. 9D and 9C will sho wthat regardless of whether the input phase displacement is 0°, 120°, or 240° the voltage spikes 144 occur at the same relative time with respect to the third harmonic wave form shown in FIG. 9C. This means that the energizing pulses which are supplied to the parallel resonant circuit 132 are characterized by a constant time spacing which is not disturbed by the keying or modulating intervals.

Continuing with the description of the invention, and more particularly with the technique for employing four input conditions or phase positions, reference will now be made to FIG. 10 wherein the reference numeral 146 indicates generally a four phase modulator stage. The circuitry of FIG. 10 is employed in a transmitter stage capable of selectively altering the phase of a reference carrier wave by 90° increments. Because of the basic similarity between the three phase transmitter shown diagrammatically in FIG. 6 and the four phase transmitter which utilizes the circuitry shown in FIG. 10, a separate block diagram of the complete four phase transmitter has not been illustrated. It is sufficient for purposes of the detailed description to indicate that the block diagram of the complete four phase transmitter is similar to that shown in FIG. 6 except for the substitution of a four phase modulator phase between the carrier oscillator stage and the transmitter output stage.

Referring again to FIG. 10, the four phase modulator stage shown includes a coupling transformer 148. The secondary of this transformer 148 is closed upon itself by means of a resistor 150 and capacitor 152 connected in series. It will be noted that the secondary winding of transformer 148 is provided with a grounded center tap.

The common junction between resistor 150 and capacitor 152 is conductively connected to the pivot point of a two-pole switch 154. The pivot point of switch 154 is connected to the control grid of a vacuum tube V1. The switch 154 is provided on the lefthand side with a terminal 156. On the righthand side, a terminal 158 is similarly provided. The terminals 156 and 158 are connected to the upper and lower ends of the secondary winding of the transformer 148, respectively. The closure of the lefthand pole of the switch 154 results in shunting the resistor 150. In like manner, the closure of the righthand pole of switch 154 results in shunting the capacitor 152.

The energizing potentials present at the control grid of the tube V1 produce a sinusoidal plate current in the primary winding of the transformer 160. The secondary winding of transformer 160 is closed upon itself by means of a tapped resistor 162 and is provided with a grounded center tap. The resistor 161 is provided with the tap junction to expedite grounding any selected portion of the resistor. The tap junction on resistor 161 is connected to the movable pole of a switch 162 shown immediately to the left. The switch 162 is provided with a contact 163 conductively connected to the juncture between the upper ends of resistor 161 and the secondary winding of transformer 160.

In operation, the shunting of capacitor 152 by means of the righthand pole of switch 154 provides a 0° phase shift on the output conductor 164. It will be observed that the conductor 164 is connected to the juncture point between a pair of resistors 167 and 169. The opposite ends of these resistors are connected to the contact 163 and the lower end of the resistor 161, respectively. In the rest condition, with the poles of switches 154 and 162 in the open position, the sine wave produced on conductor 164 is characterized by a 90° phase shift. When resistor 150 is shunted by the engagement of the lefthand pole of switch 154 with contact 156, the output signal thus provided differs from the reference phase by 180°. Finally, movement of switch 162 into engagement with contact 163 gives rise to an output sine wave displaced by 270° from the reference phase.

It will be observed that the selective closure of the movable poles of switches 154 and 162 is accomplished by means of a modulator keying stage indicated diagrammatically in FIG. 10 by the reference numeral 165. It should be understood that the invention is not limited to mechanical switching means for shunting the resistor 150, capacitor 152 or the upper portion of tapped resistor 161. For instance, the use of a pulsed thyratron or the like to provide a zero resistance path around any of these elements would be deemed to fall squarely within the purview of the appended claims.

The circuitry and components for retrieving the message from the four phase modulated carriers is indicated diagrammatically in FIG. 11. As shown, the modulated signal sensed by antenna 166 is supplied to a receiver input stage 168. After suitable amplification and modification in stage 168, the modulated signal is supplied to a phase detector stage 170. The modulated signal is also applied to a squaring circuit 172 illustrated directly beneath the input stage 168. The squared wave form thus produced is fed to a differentiating circuit 174 which produces a series of time spaced voltage spikes. These voltage spikes from circuit 174 are applied to a parallel resonant circuit 176, which is tuned to the fourth harmonic of the carrier frequency. The output of the resonant circuit 176 is applied to a frequency divider 178 comprised of circuitry for developing an output frequency one fourth of the frequency of the input signal applied thereto.

A portion of the reduced frequency potential from the frequency divider 178 is applied directly to a phase shifting stage 180. This output potential is also directly connected to the phase detector stage 170. The phase shifting stage 180 is employed for the purpose of effecting a 90° shift in the phase of the reference voltage supplied thereto. The phase shifted reference voltage thus derived is applied to an auxiliary phase detecting stage 182.

One third of the output voltage from the auxiliary phase detector stage is algebraically added to the total output potential from the phase detector stage 170 within an addition circuit 184. The circuit 184 may employ a conventional component characterized by the ability to produce an output voltage representative of the sum of the input potentials.

Because of the use of the phase shifting stage 180 with the auxiliary phase detector and addition circuit 184, the 0° and 180° phase displacements in the carrier will yield output potentials of positive and negative sign respectively. The 90° and 270° phase displacements will yield output potentials of positive and negative sign, but of one-third the magnitude of the signal produced by the 0° and 180° phase displacements. By this means, four distinct and nonambiguous values of receiver output voltage are produced to correspond with the four input shaft shift values.

In FIG. 12, there is pictorially illustrated the wave forms of a three phase system. Phase "A" is represented as a sine wave 186 having zero phase shift. Phase "B" takes the form of a sine wave 188 having a 120° phase shift and phase "C" takes the form of a sine wave 190 having a 240° phase shift. Although all of the phases are not transmitted simultaneously, they have been depicted in FIG. 12 in this fashion in order to clarify this aspect of the invention.

Below the respective sine waves 186, 188 and 190, a triple frequency sine wave 192 is shown. It will be observed that every third peak of the triple frequency wave 192 corresponds to a peak of one of the fundamental waves. For example, the first, fourth, and seventh peak of the triple frequency wave correspond time-wise to the first, second, and third peaks of the sine wave 186. The second, fifth, and eighth peaks of the triple frequency wave correspond to the peaks of the phase "B" sine wave 188. In like manner, the peaks 3, 6, and 9 of the triple frequency wave correspond to definite peaks in the phase "C" sine wave 190.

It will now be appreciated that for the occurrence of each positive peak of the triple frequency wave, there will be a positive peak in one of the carrier waves, while the other carrier waves are characterized by either zero or negative amplitudes. This correlation between positive peaks is exploited as a means of self-synchronism. Since the corresponding fundamental wave such as a phase "A," phase "B," or phase "C" can be identified by ascertaining whether coincidence is established between the peak of the fundamental wave and the first, second, or third peak of the triple frequency wave 192, it is possible to establish the relative phase with has been transmitted by identifying the particular group of triple frequency waves which correspond to the received fundamental.

If the wave 186 in FIG. 12 be regarded as a 1000 cycle per second carrier which may be periodically shifted by 120° and 240°, the positive peak of each of the received signals must invariably occur at time spacings of .001 second. Because of the 120° and 240° phase displacements, however, such positive peaks may be displaced at ±.0003 second by the phase shifting technique. Thus, the 0° phase shift wave 186 may be taken as providing positive peaks which occur at .001, .002 and .003 seconds, and so on. On the other hand, the 120° phase shifted wave 188 has positive peaks which occur at .00033; .000133; .00233, etc. In like manner, the 240° phase shifted wave 190 is characterized by positive peaks which occur at .00066; 00166; .00266 seconds. By means of the electronic commutator shown in FIG. 13, these time increments are exploited to separate the phase signals on a time basis.

In FIG. 13, the incoming energy is sampled by an antenna 194 and applied to a receiver input stage 196. From the input stage 196, the phase modulated waves are applied to a local oscillator 198. The oscillator 198 serves to provide a frequency value three times that of the incoming frequency, and is locked in with the transmitting frequency regardless of the relative phase in which this frequency occurs. Moreover, the oscillator 198 provides a gating frequency by means of which the tubes in the ring gate 200 are energized. As a result of this gating, the incoming received signal energizes an appropriate local circuit which corresponds to a particular phase function.

The gate 200 may comprise a conventional counter which employs three normally blocked counting units operated as gates. The triple frequency signal from the oscillator 198 is applied to the counter circuitry so that the positive or negative peaks cause the signal to advance one unit in the counting direction. Each individual tube of the ring gate when thus energized will become conductive and pass the incoming signal. The incoming signal applied by input stage 196 to the ring gate 200 can only be passed by the particular tube which is gated open at this particular instant. As a result, the output of the ring gate 200 takes the form of three distinct signals, each of which corresponds to one of the carrier phases which has been transmitted.

At the start of transmission, the correct phase relationship between the transmitter and the receiver may be provided by establishing a reference phase, such as phase "A." To accomplish this, the ring gate circuitry is caused to run at an incorrect speed until proper phase relationships are established. Alternatively, the ring circuitry may be allowed to step incorrectly, such as by utilizing only two stages until correct phase relationships are established. If desired, a signal of two alternating phases can be transmitted to change the ring rotation speed or sequence until the zero signal is received on a predetermined circuit. In general, any of the several expedients listed above may be utilized to establish proper phase relationships between the transmitter and the receiver.

It will be apparent to those skilled in the art that many modifications of the disclosed embodiment of this invention may be made without departing from the scope thereof which is to be measured by the appended claims.

We claim:

1. A three phase modulator stage comprising a transformer having a primary and a centrally grounded secondary winding, a three position switch including a movable pole and a set of three individual contacts, an inductor and capacitor each having one terminal thereof connected to an end of said secondary winding and the opposite terminals thereof connected to a pair of said contacts respectively, and a resistor conductively connected between the opposite end of said secondary winding and said movable pole of said three position switch, to provide an output signal of unaltered phase when said switch is open and of opposite phase displacements for said pair of contacts, respectively, said displacements exceeding 90°.

2. A signal transmitting device for the transmission of phase shift keyed signals of a given frequency with portions of three different phases including means providing a signal of a given frequency; a modulator stage including a transformer having a primary and a secondary winding, a three-position switch including a movable pole and a set of three individual contacts, an inductor and capacitor each having one terminal thereof connected to an end of said secondary winding and the opposite terminal thereof connected to a pair of said contacts respectively, a resistor conductively connected between the opposite end of said secondary winding and said movable pole of said three-position switch; a modulator keying stage for controlling the movement of said movable pole; and means connected to said movable pole and a point intermediate the ends of said secondary winding for propagating the signal appearing between said movable pole and said point.

3. A signal transmitting device for the transmission of phase shift keyed signals of a given frequency with portions of three different phases including means providing a signal of a given frequency; a modulator stage including first and second output terminals, a transformer having a primary winding connected to said signal producing means and a secondary winding having said first output terminal connected intermediate the ends of said secondary winding, a first, second and third impedance branch, said first impedance branch connected between one end of said secondary winding and said second output terminal, each of said second and third branches having one end connected to said other end of said secondary winding, means for connecting the other end of either of said second and third branches to said second output terminal, said modulator stage having an output signal with a first phase relationship with respect to a signal applied to said transformer when only said first impedance branch is connected to said second output terminal, a second phase relationship with respect to the signal applied to said transformer when said second impedance branch is connected to said second output terminal and a third phase relationship with respect to the signal applied to said transformer when said third impedance branch is connected to said second output terminal; a modulator keying stage for controlling the operation of said connecting means; and means connected to said output terminal for propagating the signal appearing at said output terminals.

4. A signal transmitting device for the transmission of phase shift keyed signals of a given frequency with portions of the three different phases including means providing a signal of a given frequency; a modulator stage including first and second output terminals, three circuits for connection to said output terminals and means for connecting any one of said circuits to said output terminals; one of said circuits including a transformer having a primary winding connected to receive said signal and a secondary winding with said first output terminal connected intermediate the ends of said secondary winding, an inductor connected between one end of said secondary winding and said second output terminal and a capacitor for connection between the other end of said secondary winding and said second output terminal to provide an output signal at said output terminals of one phase relationship with respect to said signal applied to said primary winding; another of said circuits being the same as said one circuit with an inductor substituted for said capacitor to provide an output signal at said output terminals having a second phase relationship with respect to said signal applied to said primary winding; the remaining circuit of said three circuits being the same as said one circuit with said capacitor removed to provide an output signal at said output terminals having a third phase relationship with respect to said signal applied to said primary winding; a modulator keying stage for controlling the operation of said connecting means; and means connected to said output terminals for propagating the signal appearing at said output terminals.

5. A three phase modulator stage for a communication system employing a fixed frequency of transmission for the conveying of information by shifts of phase each equal to ⅓ of a cycle thereof, comprising a transformer having a primary energized at set frequency and a centrally grounded secondary winding, a resistive connection from one terminal of said secondary winding to an output terminal for the modulator, an inductive element connected at one end thereof to the opposite end of said secondary and at the other end thereof to a second output terminal for the modulator, a capacitive connection from said second terminal to a third output terminal for said modulator, the values of said resistive, capacitive and inductive elements being adjusted such that said output terminals receive transformed wave outputs of which one represents 0° phase, a second represents 120° and the third said terminal represents an output of 240°, each with respect to the wave in said secondary, and means responsive to a keying signal for connecting one of said three output terminals to form the output of said modulator.

6. In a communication system for transferring information over a distance in accordance with equal steps of phase shift of a transmitted wave, a carrier oscillator stage providing a wave of fundamental frequency for transmission, a transmiter output stage connected to receive and couple said wave to an output circuit, means connected to last said means for propagating said wave, and means responsive to an information signal to advance at intervals the transmitted phase of said wave instantaneously by ⅓ of a cycle and to retard the transmitted phase by ⅓ cycle at other intervals, whereby there is transmitted at each instant but one of said phases of said fundamental frequency wave to convey a three-condition information signal.

7. In the information transferring system of claim 6, said phase shifting means comprising a transformer having a primary energized at said frequency, a secondary having a center tap at fixed potential, one terminal of said secondary being connected by way of a resistor to an output terminal, the opposite terminal of said secondary being connected by way of an inductive impedance to a second output terminal and by way of a capacitive impedance to a third output terminal, and means selectively connecting one of said output terminals at each instant to form the input for said transmitter output stage.

References Cited in the file of this patent

UNITED STATES PATENTS

| | | |
|---|---|---|
| 2,167,480 | Hansell | July 25, 1939 |
| 2,195,856 | Fitch | Apr. 2, 1940 |
| 2,196,381 | Bliss | Apr. 9, 1940 |
| 2,350,331 | Salinger | June 6, 1944 |
| 2,374,495 | Morrison | Apr. 24, 1945 |
| 2,456,992 | Pugsley | Dec. 21, 1948 |
| 2,491,810 | Guanella | Dec. 20, 1949 |
| 2,676,245 | Doelz | Apr. 20, 1954 |
| 2,698,876 | Bourgonjon | Jan. 4, 1955 |
| 2,797,313 | Wasmansdorff | June 25, 1957 |
| 2,905,812 | Doelz et al. | Sept. 22, 1959 |

FOREIGN PATENTS

| | | |
|---|---|---|
| 892,909 | Germany | Sept. 3, 1953 |